US011372229B2

(12) United States Patent
Xiong et al.

(10) Patent No.: US 11,372,229 B2
(45) Date of Patent: Jun. 28, 2022

(54) ADJUSTING HAND WHEEL SET HAVING ZERO POSITION LIMITING FUNCTION AND SIGHT

(71) Applicant: WUHAN GOLDEN MINNA PHOTOELECTRIC SCI & TECH CO,.LTD, Hubei (CN)

(72) Inventors: Haibei Xiong, Wuhan (CN); Min Xiong, Wuhan (CN); Xiaoming Peng, Wuhan (CN); Xing Zhao, Wuhan (CN)

(73) Assignee: WUHAN GOLDEN MINNA PHOTOELECTRIC SCI & TECH CO., LTD, Wuhan (CN)

( * ) Notice: Subject to any disclaimer, the term of this patent is extended or adjusted under 35 U.S.C. 154(b) by 64 days.

(21) Appl. No.: 17/060,368

(22) Filed: Oct. 1, 2020

(65) Prior Publication Data
US 2022/0066192 A1    Mar. 3, 2022

(30) Foreign Application Priority Data

Aug. 28, 2020    (CN) .......................... 202010889292.4

(51) Int. Cl.
*G02B 23/16*    (2006.01)
*F41G 1/38*    (2006.01)

(52) U.S. Cl.
CPC ............. *G02B 23/16* (2013.01); *F41G 1/38* (2013.01)

(58) Field of Classification Search
CPC ........... G02B 23/16; G02B 23/14; F41G 1/38; F41G 1/473
See application file for complete search history.

(56) References Cited

U.S. PATENT DOCUMENTS

| | | | |
|---|---|---|---|
| 2003/0140545 A1* | 7/2003 | Huber | F41G 1/38 42/122 |
| 2011/0061285 A1* | 3/2011 | Hamilton | F41G 1/38 42/122 |
| 2013/0167425 A1* | 7/2013 | Crispin | F41G 1/16 42/119 |
| 2013/0276345 A1* | 10/2013 | Hamilton | G02B 23/14 42/119 |
| 2013/0312310 A1* | 11/2013 | Geller | F41G 1/38 42/122 |
| 2014/0002815 A1* | 1/2014 | Jaeschke | F41G 1/38 356/247 |

(Continued)

*Primary Examiner* — Joshua E Freeman
(74) *Attorney, Agent, or Firm* — Dragon Sun Law Firm, P.C.; Jinggao Li, Esq.; Nathaniel Perkins

(57) ABSTRACT

The present invention discloses an adjusting hand wheel set having a zero position limiting function and a sight. The adjusting hand wheel set includes an adjusting hand wheel, a zeroing screw, a hand wheel seat, a hand wheel buckle cover, an adjusting base and an adjusting screw, where a linkage ring is disposed in the adjusting hand wheel, and a linkage protrusion integrally formed with the linkage ring is disposed on an outer wall of the linkage ring along any radius direction of the linkage ring. The adjusting hand wheel set further includes a stop ring, an upper port of the stop ring is internally provided with a ring surface integrally formed with the stop ring, the ring surface is provided with a linkage groove along any radius direction of the ring surface, and a first limit protrusion is disposed on a bottom surface of the ring.

10 Claims, 4 Drawing Sheets

(56) References Cited

U.S. PATENT DOCUMENTS

| | | | |
|---|---|---|---|
| 2015/0316350 A1* | 11/2015 | Hamilton | G02B 7/004 42/122 |
| 2016/0231554 A1* | 8/2016 | Tang | G02B 23/14 |
| 2017/0205195 A1* | 7/2017 | Sheets, Jr. | G02B 23/10 |
| 2018/0313633 A1* | 11/2018 | Delz | G02B 23/14 |
| 2019/0310052 A1* | 10/2019 | Krausz | F41G 1/38 |
| 2019/0376765 A1* | 12/2019 | Hamilton | F41G 1/38 |
| 2020/0018569 A1* | 1/2020 | Hofmann | F41G 1/38 |
| 2020/0278179 A1* | 9/2020 | Ding | F41G 1/545 |
| 2020/0326155 A1* | 10/2020 | Hamilton | G02B 23/00 |
| 2021/0325147 A1* | 10/2021 | Gruner | F41G 1/38 |
| 2021/0389553 A1* | 12/2021 | Campbell | G02B 7/16 |

\* cited by examiner

ADJUSTING HAND WHEEL SET HAVING ZERO POSITION LIMITING FUNCTION AND SIGHT

CROSS-REFERENCE TO RELATED APPLICATION

This Application claims priorities from CN Application No. CN 2020108892924, filed Aug. 28, 2020, the contents of which are incorporated herein in the entirety by reference.

TECHNICAL FIELD

The present invention relates to the technical field of gun aiming, and in particular, to an adjusting hand wheel set having a zero position limiting function and a sight.

BACKGROUND

To help a user implement accurate shooting, an optical sight is often added to a gun as an auxiliary aiming tool. However, even in an ideal environment, due to the self-weight of bullets, the user can only hit a point B below a point A of a bull's eye when aiming at the point A of the bull's eye. Therefore, the gun must be corrected before use.

A correction process includes: keeping a gun position unchanged, and rotating an adjusting hand wheel, so that an actual impact point B in a sight lens coincides with a cross center point of a reticle; unscrewing a zeroing screw and removing the adjusting hand wheel, rotating the adjusting hand wheel such that a zero position of a graduated scale on an outer wall of the adjusting hand wheel is aligned with a zero position mark on a lens barrel, and then reinstalling the adjusting hand wheel to make the adjusting hand wheel return to zero.

After the gun correction is completed, the shooting accuracy is greatly improved when shooting is performed again under the same conditions. However, the zero position of the adjusting hand wheel set on the existing sight is not unique. After the adjusting hand wheel is rotated, the user may forget the zero position, and it is difficult for other users to know the specific zero position. More rotation or wrong rotation occurs easily in the subsequent process of returning to zero. For example, when the adjusting hand wheel is rotated back to the zero position from half a turn, one more turn in the forward or reverse direction may occur. Therefore, the prior art has shortcomings.

SUMMARY

In view of the technical status, the present invention provides an adjusting hand wheel set having a zero position limiting function and a sight. The adjusting hand wheel set can quickly return to zero on the sight, thus avoiding misoperation in the process of returning to zero.

To implement the foregoing objective, the present invention adopts the following technical solutions:

An adjusting hand wheel set having a zero position limiting function, including an adjusting hand wheel, a zeroing screw, a hand wheel seat, a hand wheel buckle cover, an adjusting base and an adjusting screw, where the adjusting base is nested in the hand wheel seat, the adjusting base and the hand wheel seat are provided with mutually matched tooth connection surfaces respectively, an upper end of the adjusting screw is in embedded running fit and connection with the adjusting base, a middle portion of the adjusting screw is in threaded connection with the hand wheel seat, the hand wheel buckle cover is disposed on the hand wheel seat and fixedly connected to the hand wheel seat, an outer wall of the adjusting hand wheel is provided with a graduated scale, and the adjusting hand wheel is locked and connected with the adjusting base through the zeroing screw, where a linkage ring is disposed in the adjusting hand wheel and fixedly connected to the adjusting hand wheel, a linkage protrusion integrally formed with the linkage ring is disposed on an outer wall of the linkage ring along any radius direction of the linkage ring, and the linkage protrusion on the linkage ring is aligned with a zero position of the graduated scale on the outer wall of the adjusting hand wheel;

the adjusting hand wheel set further includes a stop ring, an upper port of the stop ring is internally provided with a ring surface integrally formed with the stop ring, the ring surface is provided with a linkage groove along any radius direction of the ring surface, and a first limit protrusion is disposed on a bottom surface of the ring surface at the edge of one side of the linkage groove; the stop ring is nested on the hand wheel buckle cover and is in threaded connection with the hand wheel buckle cover; after the adjusting hand wheel is locked with the adjusting base, the linkage protrusion is embedded in the linkage groove;

a top surface of the hand wheel buckle cover is provided with a second limit protrusion, and when the stop ring is screwed on the hand wheel buckle cover until the first limit protrusion and the second limit protrusion form a limit, the linkage groove is located over the second limit protrusion.

Further, the second limit protrusion is a limit screw, and the top surface of the hand wheel buckle cover is provided with an assembly screw hole matched with the limit screw.

Further, a height of the linkage protrusion is greater than that of the tooth connection surface of the adjusting base.

Further, the first limit protrusion is located at the edge of the left side of the linkage groove, and the graduated scale on the outer side wall of the adjusting hand wheel is anticlockwise.

Further, the first limit protrusion is located at the edge of the right side of the linkage groove, and the graduated scale on the outer side wall of the adjusting hand wheel is clockwise.

A sight includes a lens barrel and an adjusting hand wheel set installed on the lens barrel, where the lens barrel is provided with a zero position mark, a hand wheel seat in the adjusting hand wheel set is disposed on the lens barrel and fixedly connected to the lens barrel, a lower end of an adjusting screw in the adjusting hand wheel set is connected to an adjusting structure in the lens barrel, and a second limit protrusion on a hand wheel buckle cover in the adjusting hand wheel set is aligned with the zero position mark on the lens barrel.

Further, a plurality of assembly screw holes matched with limit screws are circumferentially and uniformly formed in a top surface of the hand wheel buckle cover.

The present invention has the following beneficial effects:

According to the sight, a linkage ring, a stop ring and a second limit protrusion are added in an adjusting hand wheel set. The linkage ring is disposed in an adjusting hand wheel, and the second limit protrusion is disposed on a hand wheel buckle cover. After correction, when the adjusting hand wheel rotates in the direction of the zero position, the stop ring is driven to rotate by the linkage ring, and a first limit protrusion on the stop ring and the second limit protrusion on the hand wheel buckle cover form a limit at the position of a zero position mark. This makes the adjusting hand wheel set quickly return to zero, avoiding misoperation in the process of returning to zero.

Description of numeral references: 1. adjusting hand wheel, 2. zeroing screw, 3. adjusting base, 4. adjusting screw, 5. hand wheel seat, 6. hand wheel buckle cover, 7. linkage ring, 8. stop ring, 9. assembly screw hole, 10. limit screw, 11. linkage protrusion, 12. linkage groove, 13. first limit protrusion, 14. ring surface, 15. lens barrel.

DESCRIPTION OF THE EMBODIMENTS

The present invention is further described below with reference to the accompanying drawings.

Figure 1:
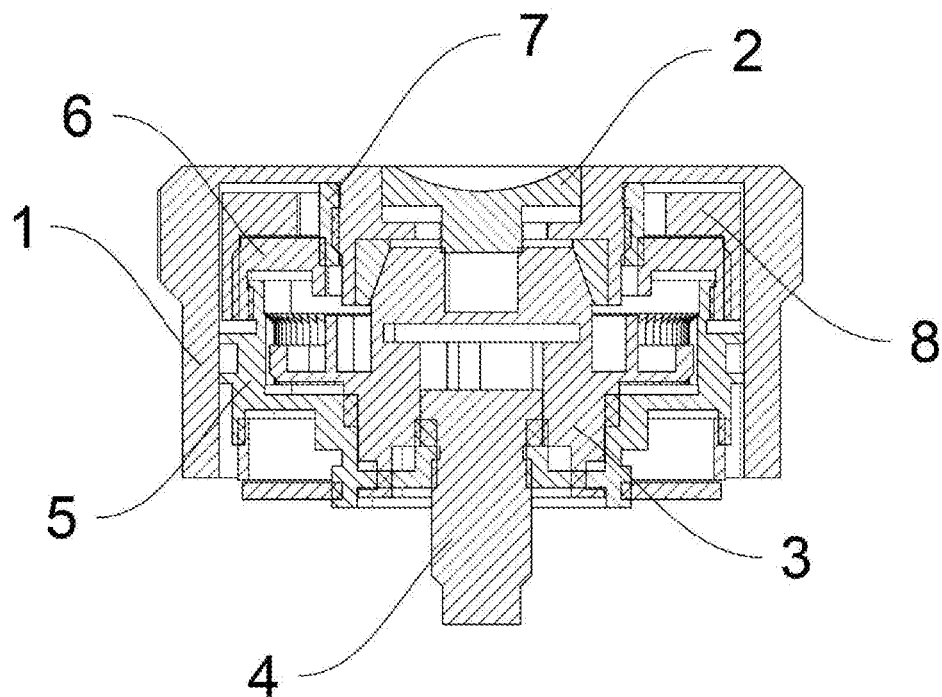
FIG. 1 is a schematic diagram of a cross-sectional structure of an adjusting hand wheel set according to the present invention.

Referring to FIG. 1, an adjusting hand wheel set having a zero position limiting function includes an adjusting hand wheel 1, a zeroing screw 2, a hand wheel seat 5, a hand wheel buckle cover 6, an adjusting base 3 and an adjusting screw 4.

The adjusting base 3 is nested in the hand wheel seat 5, and the adjusting base 3 and the hand wheel seat 5 are provided with mutually matched tooth connection surfaces respectively. The adjusting base 3 cannot rotate when the tooth connection surface of the adjusting base 3 is meshed with the tooth connection surface of the hand wheel seat 5. The adjusting base 3 can rotate when the tooth connection surface of the adjusting base 3 is separated from the tooth connection surface of the hand wheel seat 5.

An upper end of the adjusting screw 4 is in embedded running fit and connection with the adjusting base 3. A conventional method is that a square column is embedded in a square hole to implement running fit. A middle portion of the adjusting screw 4 is in threaded connection with the hand wheel seat 5. The adjusting base 3 can drive the adjusting screw 4 to rotate in the hand wheel seat 5 and move up and down.

The hand wheel buckle cover 6 is disposed on the hand wheel seat 5 and fixedly connected to the hand wheel seat 5. The hand wheel buckle cover 6 and the hand wheel seat 5 are generally locked by glue after being in threaded connection with each other.

An outer wall of the adjusting hand wheel 1 is provided with a graduated scale, and the graduated scale is configured to mark the adjustment amount of an adjusting structure. The adjusting hand wheel 1 is locked and connected to the adjusting base 3 through the zeroing screw 2. An upper end face of the zeroing screw 2 is provided with a-shaped opening, and the zeroing screw 2 can be screwed or unscrewed through a coin or the like. An outer wall of the hand wheel seat 5 is provided with a rubber ring. After the adjusting hand wheel 1 is locked with the adjusting base 3, an inner wall of the adjusting hand wheel 1 is in contact with the rubber ring, so that the touch in rotating the adjusting hand wheel 1 can be improved.

Figure 3:
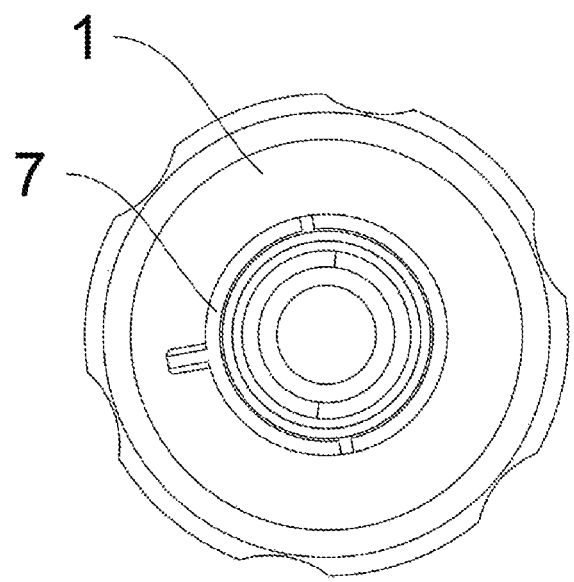
FIG. 3 is an upward view of an adjusting hand wheel according to the present invention.
Figure 4:
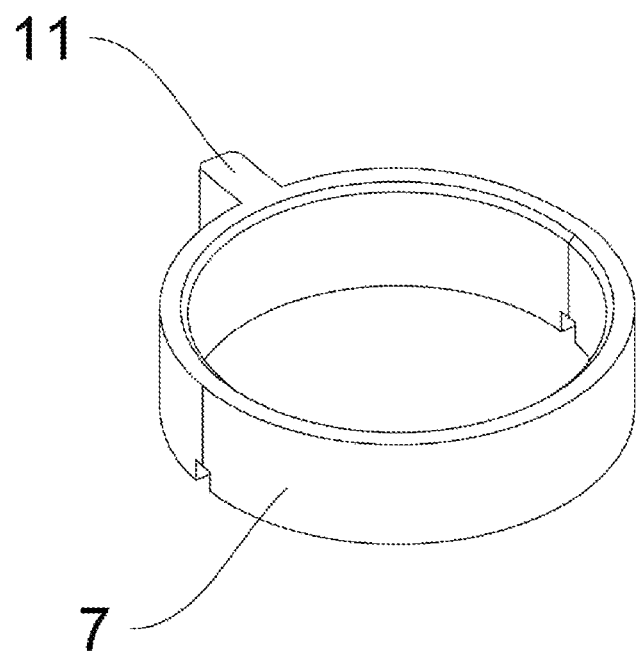
FIG. 4 is a stereogram of a linkage ring according to the present invention.

Referring to FIGS. 3 and 4, in the foregoing technical solution, a linkage ring 7 is disposed in the adjusting hand wheel 1 and fixedly connected to the adjusting hand wheel 1, and a linkage protrusion 11 integrally formed with the linkage ring 7 is disposed on an outer wall of the linkage ring 7 along any radius direction of the linkage ring 7. The linkage protrusion 11 on the linkage ring 7 is aligned with the graduated scale on the outer wall of the adjusting hand wheel 1.

Figure 5:
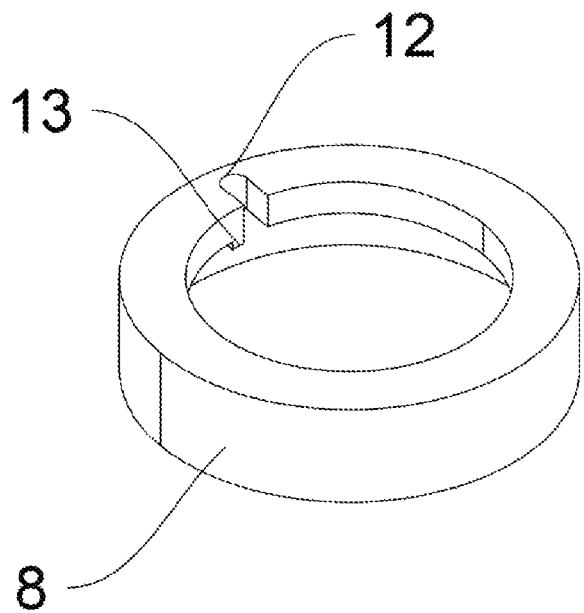
FIG. 5 is a stereogram of a stop ring according to the present invention.
Figure 6:
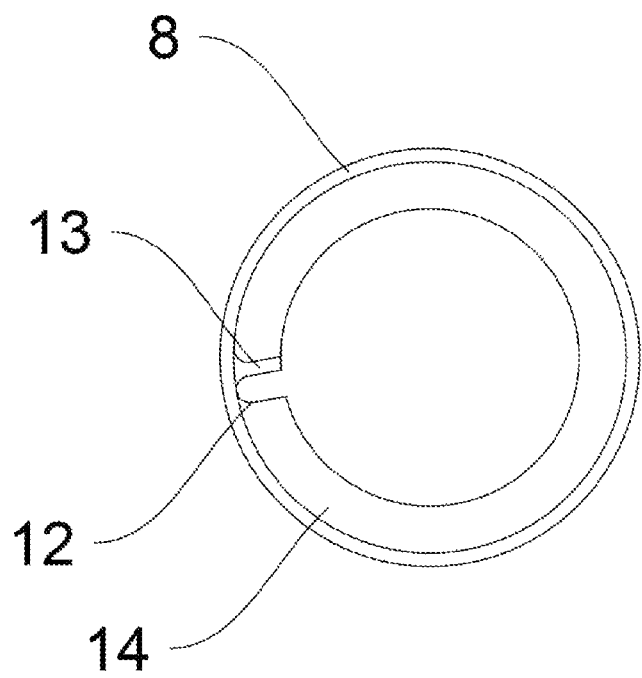
FIG. 6 is an upward view of a stop ring according to the present invention.

Referring to FIGS. 5 and 6, in the foregoing technical solution, the adjusting hand wheel set further includes a stop ring 8, an upper port of the stop ring 8 is internally provided with a ring surface 14 integrally formed with the stop ring 8, the ring surface 14 is provided with a linkage groove 12 along any radius direction of the ring surface 14, and a first limit protrusion 13 is disposed on a bottom surface of the ring surface 14 at the edge of one side of the linkage groove 12. The stop ring 8 is nested on the hand wheel buckle cover 6 and is in threaded connection with the hand wheel buckle cover 6. After the adjusting hand wheel 1 is locked with the adjusting base 3, the linkage protrusion 11 is embedded in the linkage groove 12.

Figure 2:
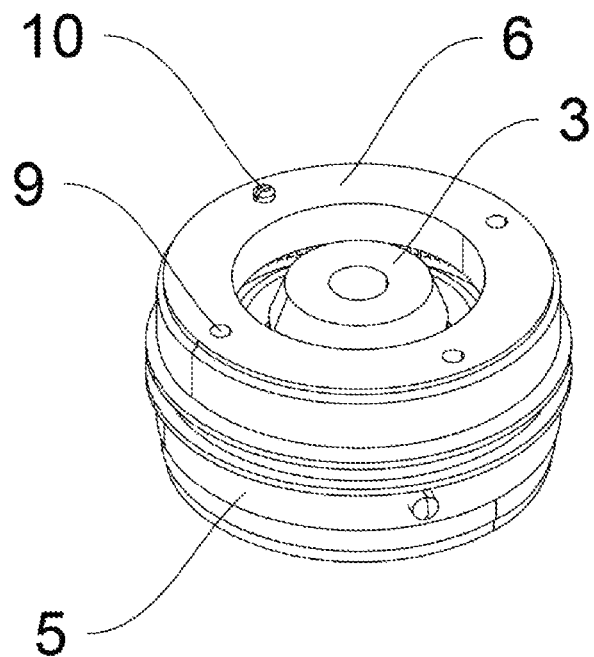
FIG. 2 is a stereogram of an adjusting hand wheel set according to the present invention (without an adjusting hand wheel and a zeroing screw)

Referring to FIG. 2, in the foregoing technical solution, a top surface of the hand wheel buckle cover 6 is provided with a second limit protrusion, and when the stop ring 8 is screwed on the hand wheel buckle cover 6 until the first limit protrusion 13 and the second limit protrusion form a limit, the linkage groove 12 is located over the second limit protrusion. After the adjusting hand wheel 1 is installed to make the linkage protrusion 11 embedded in the linkage groove 12, the zero position of the graduated scale on the outer side wall of the adjusting hand wheel 1 is aligned with the second limit protrusion on the hand wheel buckle cover 6.

The second limit protrusion is a limit screw 10, and the top surface of the hand wheel buckle cover 6 is provided with a plurality of assembly screw holes 9 matched with the limit screw 10.

When rotated, the adjusting hand wheel 1 needs to be lifted upwards, so that the tooth connection surface of the adjusting base 3 is separated from the tooth connection surface of the hand wheel seat 5. Therefore, the height of the linkage protrusion 11 should be greater than that of the tooth connection surface of the adjusting base 3, so as to avoid the problem that linkage fit of the linkage protrusion 11 and the linkage groove 12 cannot be implemented after the adjusting hand wheel 1 is lifted upwards.

In one embodiment, the first limit protrusion 13 is located at the edge of the left side of the linkage groove 12, and the graduated scale on the outer side wall of the adjusting hand wheel 1 is anticlockwise. In another embodiment, the first limit protrusion 13 is located at the edge of the right side of the linkage groove 12, and the graduated scale on the outer side wall of the adjusting hand wheel 1 is clockwise.

Figure 7:
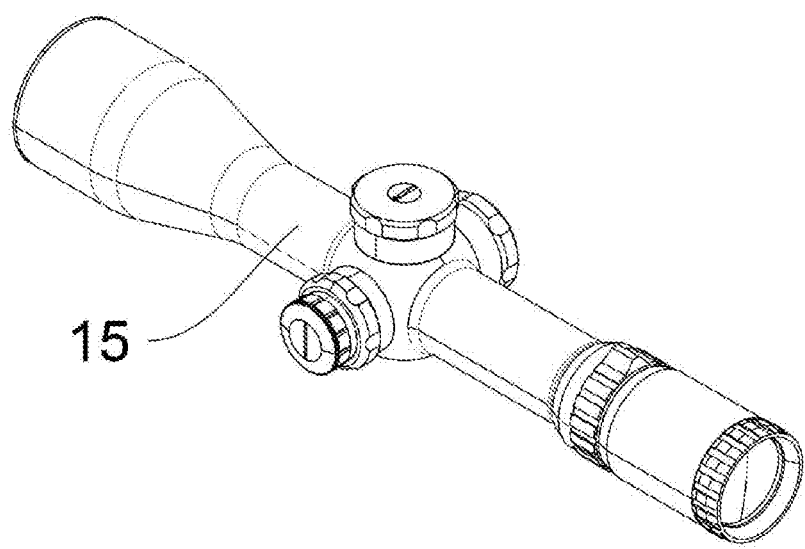
FIG. 7 is a stereogram of a sight according to the present invention.

Referring to FIG. 7, a sight includes a lens barrel 15 and an adjusting hand wheel set installed on the lens barrel 15. The lens barrel 15 is provided with a zero position mark including but not limited to a dot and a straight line.

After the adjusting hand wheel set is installed on the lens barrel 15, a hand wheel seat 5 in the adjusting hand wheel set is disposed on the lens barrel 15 and fixedly connected to the lens barrel 15. The hand wheel seat 5 and the lens barrel 15 are generally locked by glue after being in threaded connection with each other. A lower end of an adjusting screw 4 in the adjusting hand wheel set is connected to an adjusting structure in the lens barrel 15. When the adjusting base 3 drives the adjusting screw 4 to rotate in the hand wheel seat 5 and move up and down, the adjusting screw 4 drives the adjusting structure in the lens barrel 15 to adjust an optical axis state. A second limit protrusion on a hand wheel buckle cover 6 in the adjusting hand wheel set is aligned with a zero position mark on the lens barrel 15.

Since the hand wheel seat 5 is fixedly connected to the lens barrel 15, the zero position mark can also be designed on the hand wheel seat 5.

The hand wheel buckle cover 6 is in threaded connection with the hand wheel seat 5. When the hand wheel buckle cover 6 is completely screwed on the hand wheel seat 5, the second limit protrusion is aligned with the zero position mark on the lens barrel 15. Since the hand wheel buckle cover 6 is in threaded connection with the hand wheel seat 5, an error may occur. Therefore, preferably, a plurality of assembly screw holes 9 matched with limit screws 10 are circumferentially and uniformly formed in a top surface of the hand wheel buckle cover 6. As shown in FIG. 2, there are 4 assembly screw holes 9. When the hand wheel buckle cover 6 is completely screwed on the hand wheel seat 5, one assembly screw hole 9 aligned with the zero position mark on the lens barrel 15 can be obtained only by retreating by 0-90°, and the adjustment range of the hand wheel buckle cover 6 is small. Then the limit screw 10 is placed into the assembly screw hole 9, and the hand wheel buckle cover 6 is locked by glue or other means. In theory, when the number of the assembly screw holes 9 is large, it is the better.

Specifically, a process of correcting a gun with the sight is as follows: a stop ring 8 in the adjusting hand wheel set on the sight is not installed; a user actually hits a point B when aiming at a point A of a bull's eye; the position of the gun is kept unchanged, and an adjusting hand wheel 1 is lifted and rotated, so that the actual impact point B in a sight lens coincides with a cross center point of a reticle; a zeroing screw 2 is unscrewed and the adjusting hand wheel 1 is removed, and the stop ring 8 is installed and screwed downwards on a hand wheel buckle cover 6 until a first limit protrusion 13 and a second limit protrusion form a limit; and after the adjusting hand wheel 1 is installed to make a linkage protrusion 11 embedded in a linkage groove 12, the zero position of a graduated scale on the outer wall of the adjusting hand wheel 1 is aligned with the zero position mark on a lens barrel 15; that is, the adjusting hand wheel set has returned to zero, then the zeroing screw 2 is screwed, the adjusting hand wheel 1 is pressed downwards, and in this case, the adjusting hand wheel 1 cannot rotate.

In the subsequent use process, the user can rotate the adjusting hand wheel 1 according to the actual shooting conditions, and then only needs to rotate the adjusting hand wheel 1 clockwise or anticlockwise until the adjusting hand wheel 1 cannot rotate, so that the adjusting hand wheel set can quick return to zero. When other users use the gun, they also only need to rotate the adjusting hand wheel 1 clockwise or anticlockwise until the adjusting hand wheel 1 cannot rotate, so that the adjusting hand wheel set can quickly return to zero.

Certainly, the above is only a preferred embodiment of the present invention, and is not intended to limit the application scope of the present invention. Therefore, any equivalent changes in accordance with the principle of the present invention should fall within the protection scope of the present invention.

What is claimed is:

1. An adjusting hand wheel set having a zero position limiting function, comprising an adjusting hand wheel, a zeroing screw, a hand wheel seat, a hand wheel buckle cover, an adjusting base and an adjusting screw, wherein the adjusting base is nested in the hand wheel seat, the adjusting base and the hand wheel seat are provided with mutually matched tooth connection surfaces respectively, an upper end of the adjusting screw is in embedded running fit and connection with the adjusting base, a middle portion of the adjusting screw is in threaded connection with the hand wheel seat, the hand wheel buckle cover is disposed on the hand wheel seat and fixedly connected to the hand wheel seat, an outer wall of the adjusting hand wheel is provided with a graduated scale, and the adjusting hand wheel is locked and connected with the adjusting base through the zeroing screw, wherein
 a linkage ring is disposed in the adjusting hand wheel and fixedly connected to the adjusting hand wheel, a linkage protrusion integrally formed with the linkage ring is disposed on an outer wall of the linkage ring along any radius direction of the linkage ring, and the linkage protrusion on the linkage ring is aligned with a zero position of the graduated scale on the outer wall of the adjusting hand wheel;
 the adjusting hand wheel set further comprises a stop ring, an upper port of the stop ring is internally provided with a ring surface integrally formed with the stop ring, the ring surface is provided with a linkage groove along any radius direction of the ring surface, and a first limit protrusion is disposed on a bottom surface of the ring surface at the edge of one side of the linkage groove; the stop ring is nested on the hand wheel buckle cover and is in threaded connection with the hand wheel buckle cover; after the adjusting hand wheel is locked with the adjusting base, the linkage protrusion is embedded in the linkage groove;
 a top surface of the hand wheel buckle cover is provided with a second limit protrusion, and when the stop ring is screwed on the hand wheel buckle cover until the first limit protrusion and the second limit protrusion form a limit, the linkage groove is located over the second limit protrusion.

2. The adjusting hand wheel set having a zero position limiting function according to claim 1, wherein the second limit protrusion is a limit screw, and the top surface of the hand wheel buckle cover is provided with an assembly screw hole matched with the limit screw.

3. The adjusting hand wheel set having a zero position limiting function according to claim 2, wherein the first limit protrusion is located at the edge of the left side of the linkage groove, and the graduated scale on the outer side wall of the adjusting hand wheel is anticlockwise.

4. The adjusting hand wheel set having a zero position limiting function according to claim 2, wherein the first limit protrusion is located at the edge of the right side of the linkage groove, and the graduated scale on the outer side wall of the adjusting hand wheel is clockwise.

5. The adjusting hand wheel set having a zero position limiting function according to claim 1, wherein a height of the linkage protrusion is greater than that of the tooth connection surface of the adjusting base.

6. The adjusting hand wheel set having a zero position limiting function according to claim 5, wherein the first limit protrusion is located at the edge of the left side of the linkage groove, and the graduated scale on the outer side wall of the adjusting hand wheel is anticlockwise.

7. The adjusting hand wheel set having a zero position limiting function according to claim 5, wherein the first limit protrusion is located at the edge of the right side of the linkage groove, and the graduated scale on the outer side wall of the adjusting hand wheel is clockwise.

8. The adjusting hand wheel set having a zero position limiting function according to claim 1, wherein the first limit protrusion is located at the edge of the left side of the linkage groove, and the graduated scale on the outer side wall of the adjusting hand wheel is anticlockwise.

9. The adjusting hand wheel set having a zero position limiting function according to claim 1, wherein the first limit protrusion is located at the edge of the right side of the linkage groove, and the graduated scale on the outer side wall of the adjusting hand wheel is clockwise.

10. A sight, comprising a lens barrel and an adjusting hand wheel set installed on the lens barrel, wherein the lens barrel is provided with a zero position mark, a hand wheel seat in the adjusting hand wheel set is disposed on the lens barrel and fixedly connected to the lens barrel, a lower end of an adjusting screw in the adjusting hand wheel set is connected to an adjusting structure in the lens barrel, and a second limit protrusion on a hand wheel buckle cover in the adjusting hand wheel set is aligned with the zero position mark on the lens barrel; wherein the second limit protrusion comprises a plurality of limit screws, and
   a plurality of assembly screw holes matched with the plurality of limit screws are circumferentially and uniformly formed in a top surface of the hand wheel buckle cover.

\* \* \* \* \*